(12) United States Patent
Irani (10) Patent No.: US 6,798,587 B2
(45) Date of Patent: Sep. 28, 2004

(54) THERMAL IMAGING COMBINATION AND METHOD

(75) Inventor: Keikhosrow Irani, Franklin Lakes, NJ (US)

(73) Assignee: Mikron Infrared, Inc., Oakland, NJ (US)

( * ) Notice: Subject to any disclaimer, the term of this patent is extended or adjusted under 35 U.S.C. 154(b) by 0 days.

(21) Appl. No.: 10/124,994

(22) Filed: Apr. 18, 2002

(65) Prior Publication Data

US 2003/0169518 A1 Sep. 11, 2003

Related U.S. Application Data

(60) Provisional application No. 60/362,743, filed on Mar. 8, 2002.

(51) Int. Cl.$^7$ ............................................... G02B 27/00
(52) U.S. Cl. .................... 359/809; 359/722; 312/223.1; 374/130
(58) Field of Search ................................ 359/642, 722, 359/734, 809, 725; 374/121, 124, 130; 324/415, 424, 501, 753; 250/330, 340, 353

(56) References Cited

U.S. PATENT DOCUMENTS 4,505,535 A * 3/1985 Neil ............................ 250/353
4,783,593 A 11/1988 Noble
5,463,222 A * 10/1995 Lesko et al. ................. 250/330

FOREIGN PATENT DOCUMENTS

GB 2 265 470 A 9/1993
JP 11023478 A 1/1999

* cited by examiner

Primary Examiner—Scott J. Sugarman
Assistant Examiner—Darryl J. Collins
(74) Attorney, Agent, or Firm—W. Patrick Quast (57) ABSTRACT

A thermal imaging instrument and method is disclosed for viewing hot spots within a normally enclosed cabinet, for example, a high voltage electrical power distribution cabinet. Large and expensive thermal viewing windows normally required for thermal examination of these cabinets utilizing standard thermal imaging cameras is obviated by the use of an accessory lens assembly. The unique combination and methodology of using the lens assembly, standard thermal imaging camera and small access opening in the cabinet face allows for the retention of the safety rating of the cabinet. Further adding to the accuracy, convenience and safety of the approach, an infrared view port, together with cap and ring chain assembly, is permanently affixed to the cabinet face in relation to the small access hole.

The unique combination of the instrument portion of the invention can be integrally combined in a single unit for exclusive use in detecting hot spots within a cabinet.

28 Claims, 8 Drawing Sheets

THERMAL IMAGING COMBINATION AND METHOD

This invention claims the benefit of U.S. Provisional Application No. 60/362,743, filed Mar. 8, 2002. This invention relates generally to a thermal imaging combination and method for measuring hot spots.

BACKGROUND

Specifically the invention includes an assembly combination and methodology for monitoring the thermal profile of an interior panel of a shut cabinet, for example, a power distribution box.

There are important applications in electrical power distribution that involve measurement of hot spots within electrical high voltage cabinets without compromising the safety of working personnel. One way is to open the cabinet door and make a quick thermal image of electrical panel. However, for a high voltage electrical cabinet, the door of the cabinet can only be opened if the power is first shut-off. As a safety precaution, the cabinet door is interlocked with the incoming power circuit breaker. The fact the power is turned off results in a cooling of electrical circuit breakers. This can result in the rapid redistribution of accumulated heat, precluding the identifications of the true hot spots. Also shutting off the power may not be desirable to the operation of down stream users.

An alternative, albeit expensive, method employed today involves installing one or more infrared transmitting windows in the cabinet door. This allows the direct thermal "viewing" of the interior of an electrical panel, without opening the cabinet door. The diameter of these windows is large in order to accommodate the large aperture of a thermal imaging camera's objective lens. The typical window diameter is 3" (75 mm). To maintain the NEMA (National Electrical Manufacturing Association) safety rating, such as 1, 2, 3, 4, or 12, of the cabinet, qualified personnel should perform the installation of this window(s); or they should be installed at the time the electrical cabinet is assembled. This involves the customization of the electrical cabinet. It is to these problems that the present invention is directed.

It is therefore a primary object of the present invention to provide a method and means for evaluating the thermal profile of the interior of an enclosure without degrading the integrity of the enclosure.

It is still another object of the present invention to provide a method and means for evaluating the thermal profile of the interior of the enclosure without opening any access door.

It is yet another object of the present invention to expand the breadth of applications for thermal imaging equipment by facilitating their use with enclosures containing heat generating equipment which needs to be monitored.

Still another object is to provide a means and method for surveying a broad internal area of an enclosure, again without violating the integrity thereof or accessing the interior through the opening of an enclosure door.

A still further object is to provide a means and method for making accurate thermal profiles of the interior of an enclosure even though the heat source within the enclosure may be positioned at various depths from the evaluating means.

SUMMARY

These and other objects are obtained with the thermal imaging combination and method of the present invention. It occurred to the applicant that an innovative lens assembly design (designated a "fisheye" assembly by the applicant) could simplify this costly and difficult measurement. Rather than placing a large diameter window(s) in the face of the cabinet door, a ⅝" (16 mm) hole is drilled in the center of the cabinet door. A ⅝" hole is permitted without compromising the safety issues. The hole can be effectively sealed while not in use. As such, the door is still able to maintain its NEMA rating. The fisheye lens assembly with a 66° diagonally wide angle field of view, can image a broad section of the cabinet interior for hot spots through this hole, in one exercise. The small objective lens of the fisheye assembly provides very wide angle viewing, at different depths, without compromising the quality of the received thermal image and the NEDT (Noise Equivalent Differential temperature) of the thermal imaging system.

In the preferred embodiment the design of the fisheye lens assembly includes multi-element, infrared transmitting optical material consistent with the spectral transmission characteristics of the thermal imager camera, for example, Model #s 7102, 7200 and 7515, manufactured by Mikron Instrument Company, Inc. of Oakland, N.J., (hereinafter "Mikron"), connected to the fisheye assembly. The lenses are placed inside a precision housing with appropriate spacing between the various lenses. A mechanism for manual focusing allows the best image quality for various depths of field, typically between 4" to 45" distance. Therefore the user has the advantage of expanding the capabilities of the thermal imager, to cover practically all preventative maintenance applications.

DESCRIPTION OF THE PREFERRED EMBODIMENTS

Figure 1:
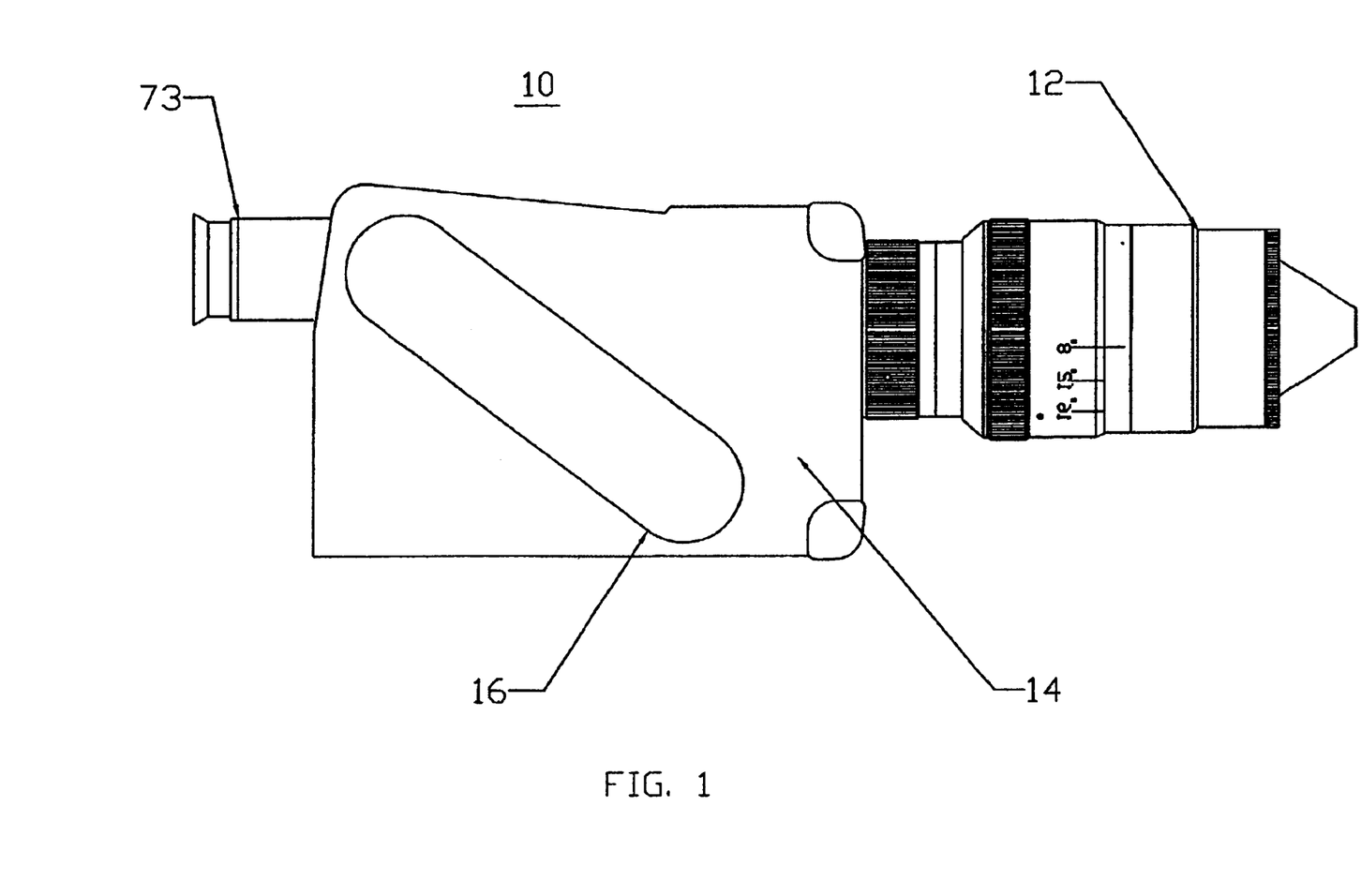
FIG. 1 is a perspective view of one version of the combination thermal camera-fisheye lens assembly portion of the present invention.

Turning now to the drawings, in FIG. 1 a version of the thermal imaging instrument portion 10 of the invention is depicted. The instrument 10 is a combination of a standard thermal imager camera 14 (such as the Mikron model no. 7102, 7200, or 7515, and similar cameras), and a lens assembly 12, designated as a fisheye lens assembly 12.

Figure 2:
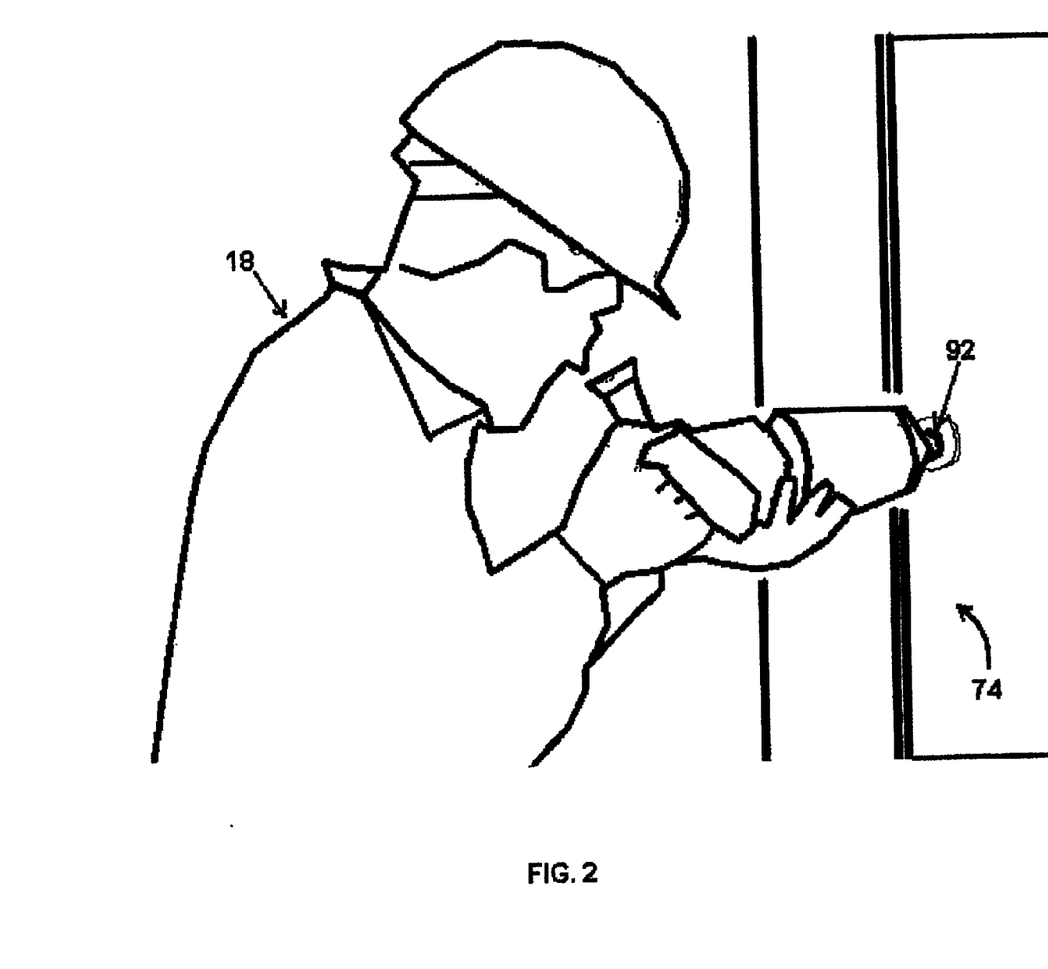
FIG. 2 is a perspective view of an operator using one version of the thermal camera-fisheye lens assembly-access hole combination of the invention.

FIG. 2 illustrates an operator 18 utilizing the combination of the thermal imaging camera 14 and fisheye lens assembly 12, making use of the strap 16 on the camera and the opening 92 in a cabinet closure 74 to view the interior of the cabinet for hot spots. The fisheye lens assembly 12 permits the use of thermal imagining cameras to see hot spots occurring over a relatively large area through a small access opening. Means are disclosed hereinafter for effectively sealing the opening so as to not violate the electrical rating of the cabinet.

Figure 3:
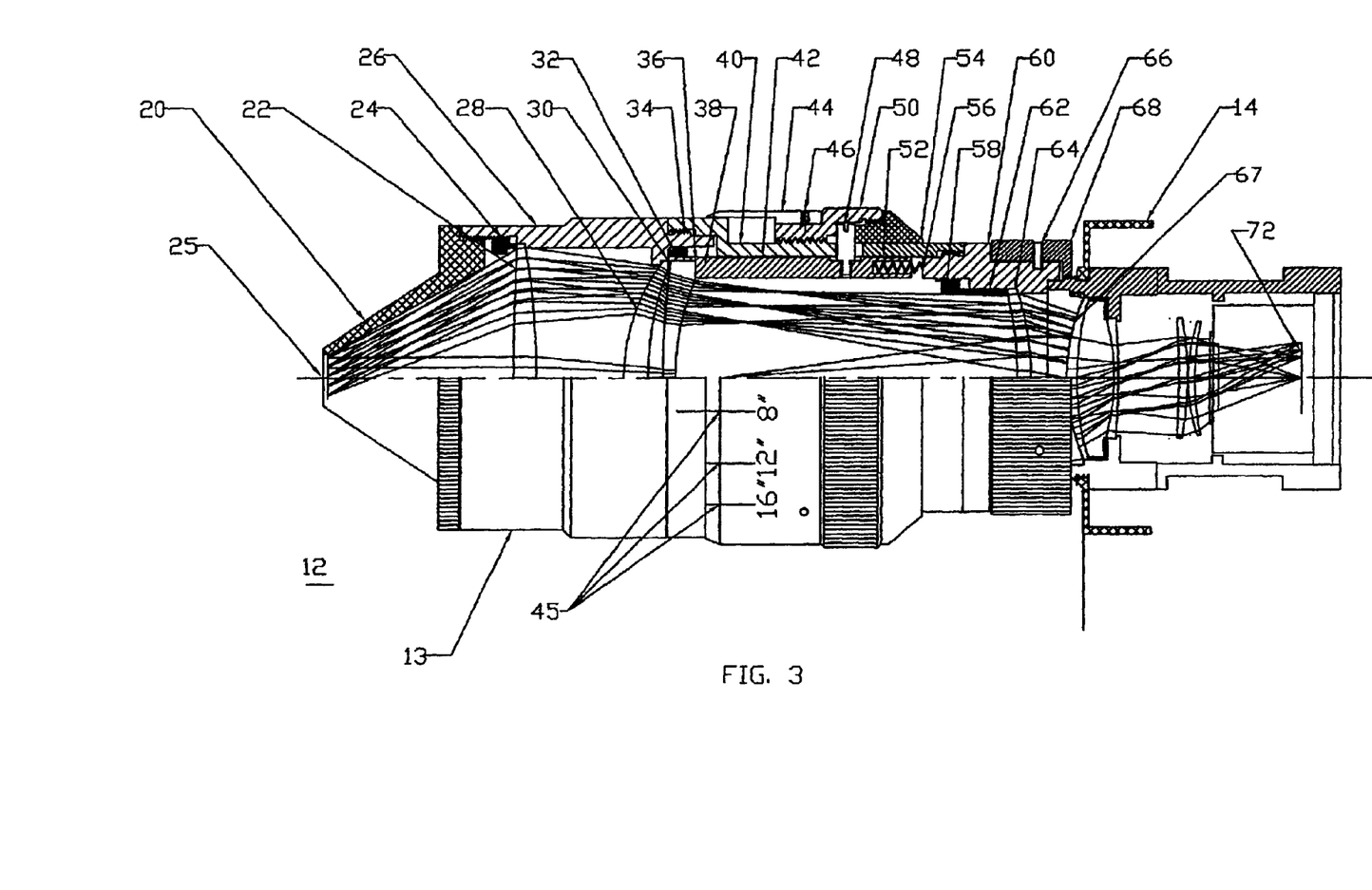
FIG. 3 is a partially sectional view of one version of the combination thermal camera-fisheye lens assembly portion of the present invention.
Figure 4:
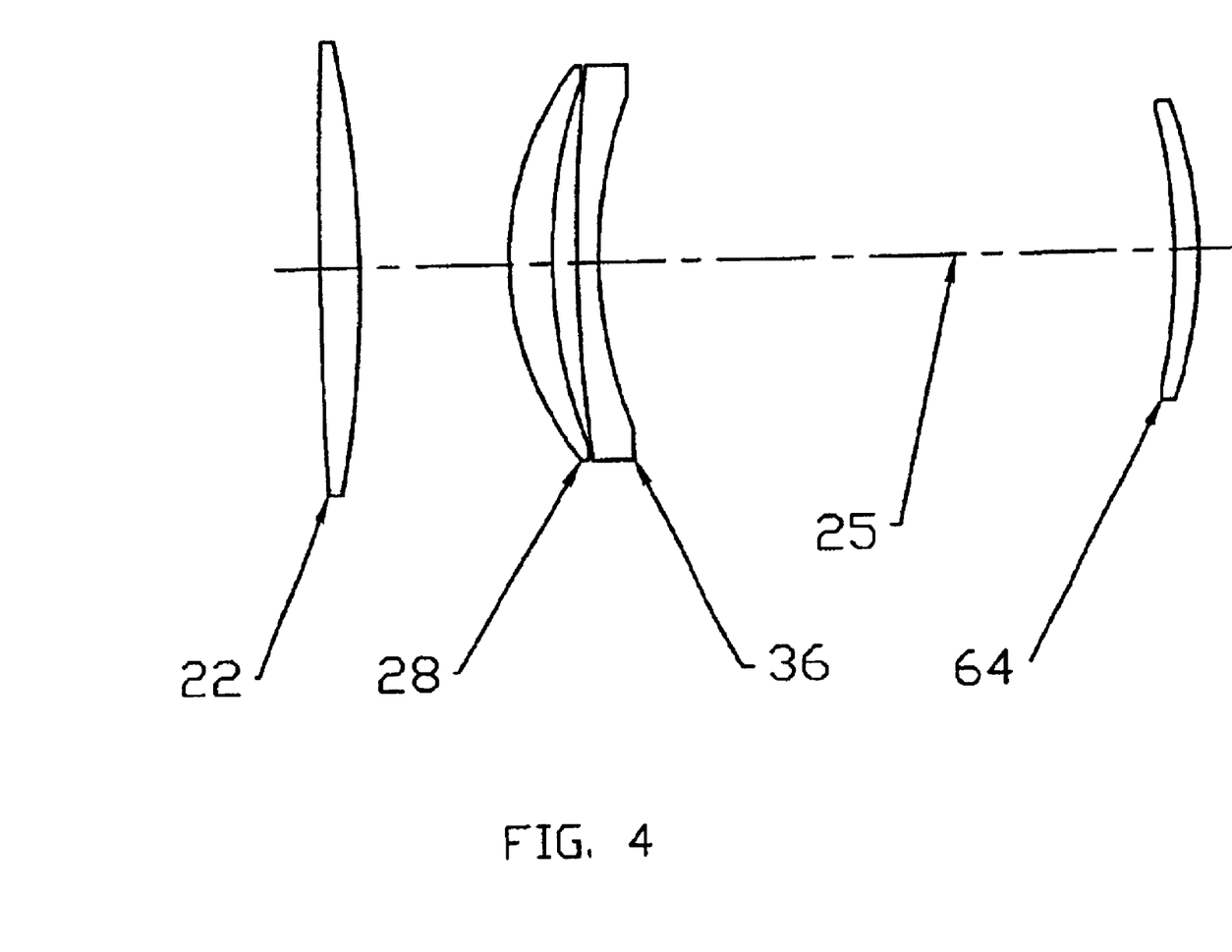
FIG. 4 is a schematic representation of the lensing system employed in one version of the fisheye lens assembly of the invention.
Figure 5A:
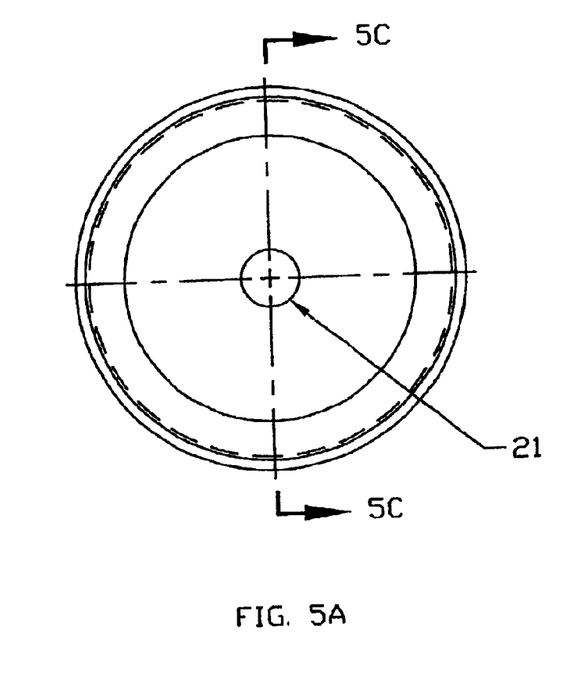
FIG. 5A is a front, elevation view of the nose portion of one version of the fisheye lens assembly of the invention.
Figures 5B, 5C:
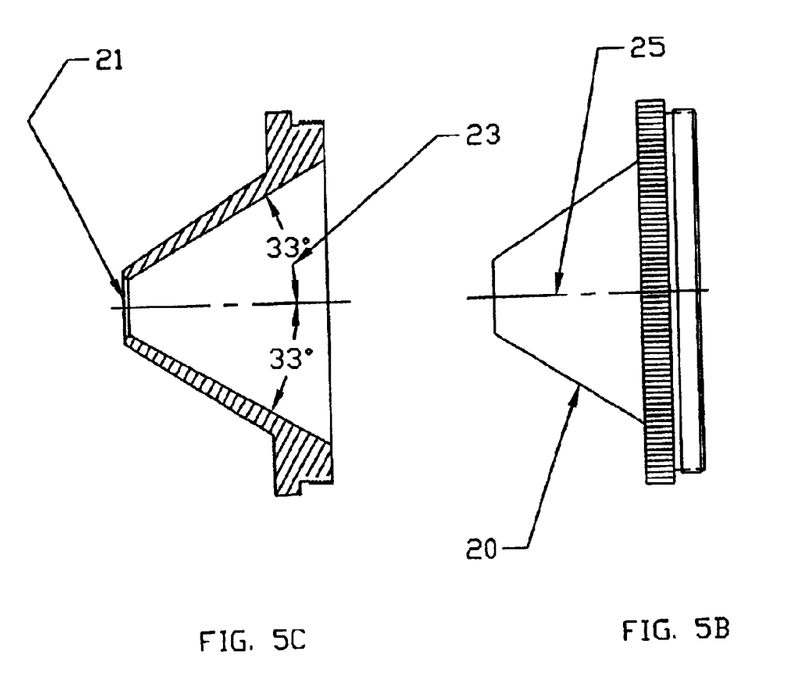
FIG. 5B is a side, elevation view of the nose portion of one version of the invention similar to the view of FIG. 5A.
FIG. 5C is a side, sectional view of the nose portion of one version of the invention, taken along the lines 5C—5C of FIG. 5A.

As best seen in FIGS. 3, 4 and 5 the fisheye lens assembly employs a four (4) lens element, reversed telescope design with the eye position or exit pupil located at the small opening of the nose 20. The conical shape of the nose 20, allows the entire ray bundle entering the small opening 21 of the nose 20, which has a very wide angle to reach lens 22. The lenses 22, 28, 36, and 64 (FIG. 4,) are configured and disposed within the lens assembly such that the angles of the ray bundles when the bundles exit from the last lens 64, is consistent with a given thermal imager optical system such as those employed in Mikron models 7102, 7200, 7515, and similar thermal cameras. This way a thermal imager can be used in addition to its conventional application, for the purposes of thermal profiling and hot spot detection in closed-door, high voltage cabinets.

The following itemized description refers to the referenced items in FIGS. 3–5.

Figure 6:
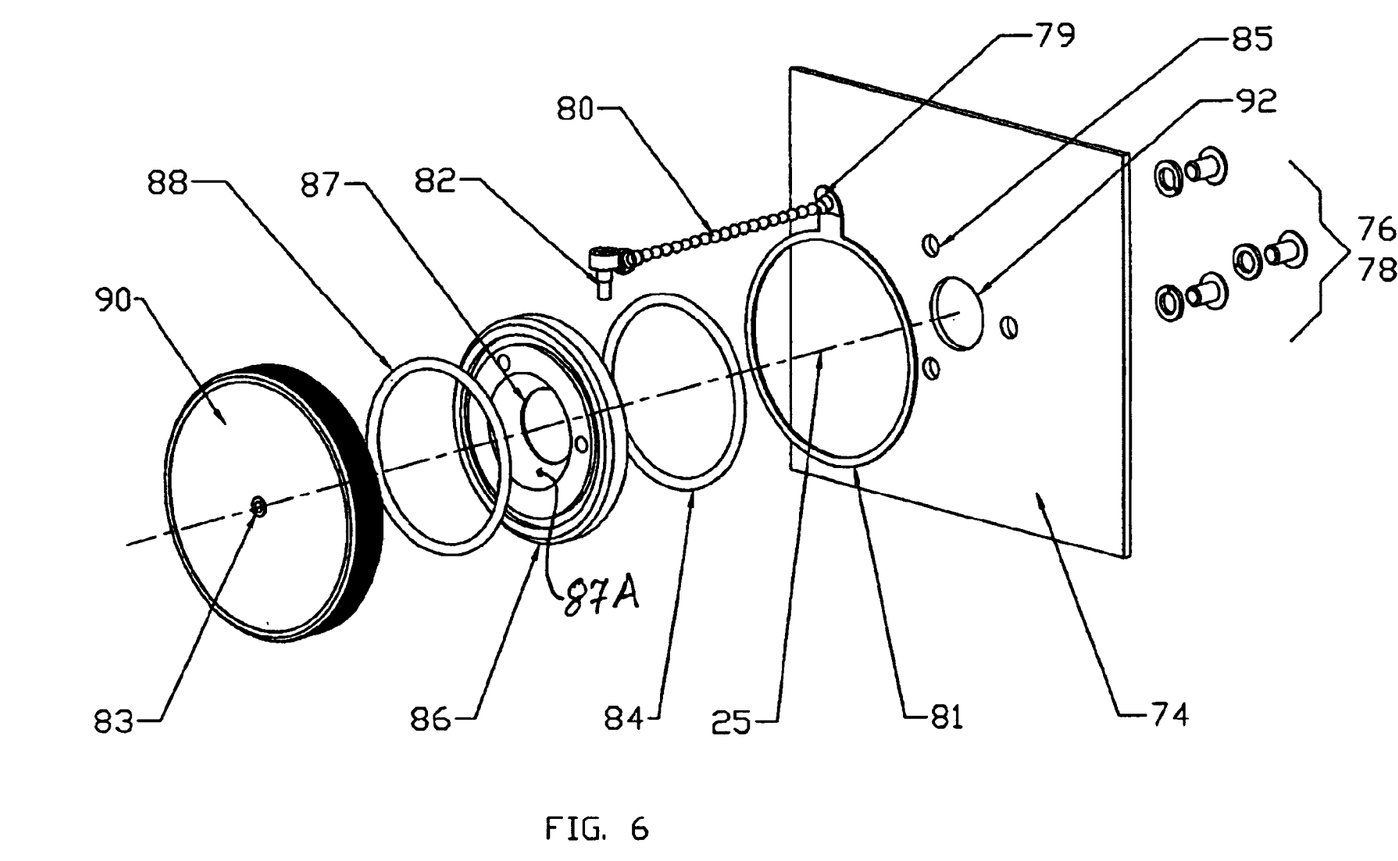
FIG. 6 is a perspective view of a portion of the cabinet face including the access opening portion of the present invention required for thermal viewing of a shut cabinet and including an exploded view of one version of a safety closure for the opening.

Nose portion 20 (FIG. 5) of the lens housing 13: This has a few important functions. It defines the minimum required hole diameter (for example, 0.625" (16 mm)) for the access opening, 92 in the face of the cabinet forming the enclosure. It allows for an easy and precise alignment when used in conjunction with the fisheye view port ring 86 (FIGS. 6 and 7) which will be more fully described below. Nose portion 20 typically is made from plastic material to insure that an extra level of electrical insulation exists between the instrument and electrical cabinet door in the unlikely event that a high voltage condition may exist in the vicinity of the opening 92 in the cabinet face 74. The diameter of the nose opening 21 in the preferred embodiment is 12 mm. The half angle 23, between the side forming the cone and the optical axis 25, in the preferred embodiment is 33° or a total angle of 66°.

Lens 22 (FIG. 4): The ray bundles emanate from a target, located at a distance, from 4" (10 cm) to 45" (115 cm), from the nose opening 21. They enter the nose opening 21 and are re-directed by lens 22, which is called an eye lens, towards the other lenses in the assembly. The material of this and all lenses must have a spectral transmissivity in the infrared range compatible with the infrared transmission characteristics of the particular thermal imager used.

Retainer 24 (FIG. 3): This is a metallic retaining ring that holds the eye lens 22 firmly in position and concentric to the system optical axis.

Front Cell 26 (FIG. 3): This portion of the housing 13 is precision machined from light metal. It houses and provides a seat for the eye lens 22 and lens 28.

Lenses 28 & 36 (FIG. 4): The ray bundles from the target which have passed through lens 22 are focused onto the combination of lenses 28 and 36. The combination of lens 28 and 36 allows for the optics within the lens assembly to focus, for different enclosure, interior distances, by varying the space between them. Lens 28 is stationary and lens 36 moves to allow an optimum image quality for a given interior distance. They form an intermediate image between lens 36 and lens 64.

Clamp 30 (FIG. 3): This clamp is made from metal and, together with the retainer 32, holds the lens 36 secure and concentric to the system optical axis.

Retainer 32 (FIG. 3): This retainer is made from metal and in combination with clamp 30 hold the lens 36 in place.

Lens 36 (FIG. 4): The cooperative relationship between lens 36 and 28 allows the optical assembly to focus optimally for different enclosure, interior distances. Lens 28 is stationary and lens 36 moves relative thereto.

Focus Slide 38 (FIG. 3): The focus slide provides a housing and seating for lens 36. It also allows sliding of lens 36, left and right as viewed in FIG. 3, for optimum focusing. A gentle pressure exerted by a plurality (eight, typically) of springs 56 circumferentially disposed around its perimeter, provides the necessary force to keep the focus slide 38 in position once the desired focusing is achieved.

Spacer Tube 40 (FIG. 3): A precision machined metallic part that guides the focus slide 38 in a concentric manner.

Scale Tube 44 (FIG. 3): A precision machined metallic part, with the focusing distance marking 45 engraved in inches and/or metric scale. Four setscrews 46 circumferentially disposed around the perimeter of tube 44, hold the scale tube 44 to actuator nut 50 after an optimum focusing is achieved for a given, cabinet interior distance.

Pin 48 (FIG. 3): This pin restricts the motion of focus slide 38 to only horizontal movement. It prevents the lens 36 from rotating. It assists in maintaining the precision of the optical axis.

Actuator nut 50 (FIG. 3): This is a precision machined metallic part that holds the guide pin 48 loosely. As the actuator nut 50 rotates, it forces the guide pin 48 to slide forward or backward forcing the focus slide to change the spacing between lens 28 and 36 for optimum image quality. It also provides a mounting thread to seal retainer 54.

Seal Retainer 54 (FIG. 3): A precision machined metallic part that seals the sensitive and exposed parts of the assembly from dust and dirt and also gives a finished look to the assembly.

Springs 56 (FIG. 3): As noted above, these springs (eight are used in the assembly of FIG. 3) provide a constant, necessary force to urge the focus slide 38 forward, to insure that the spacing between lens 28 and 36 will not change, once set, during actual usage of the lens assembly in the field.

Retainer 58 (FIG. 3): The retainer is a precision machined metallic part that forces the spacer 62 against the objective lens 64.

Rear Cell 60 (FIG. 3): A precision-machined metallic part that houses and provides a seat for the objective lens 64 and ensures its concentricity to the entire optical assembly. In addition, it provides a secure platform for a precision coupling to the front end of a given thermal imager, optical system.

Spacer 62 (FIG. 38): A precision machined metallic part that holds the objective lens 64, in place, concentric to the optical assembly.

Lens 64 (FIG. 4): The objective lens 64 takes the intermediate image produced by lens 22, 28 and 36 and produces near parallel ray bundles coming from a desired target and projects these rays into the optical system of a given thermal imager camera 14 (FIG. 1).

Setscrews 66 (FIG. 3): A set (four) of dog tail setscrews that allow the connector 68 to freely rotate on rear cell 60.

Connector 68 (FIG. 3): This is a precision machined metallic ring. It connects the entire fisheye optical assembly firmly and concentrically to the host thermal imager (camera) optical system. It also maintains the proper distance between the lens 67 of the camera and the objective lens 64 of the fisheye optical assembly. The outside diameter of the rear connector 68 is knurled to provide a firm grip during attachment of the fisheye assembly to the camera.

Figure 8:
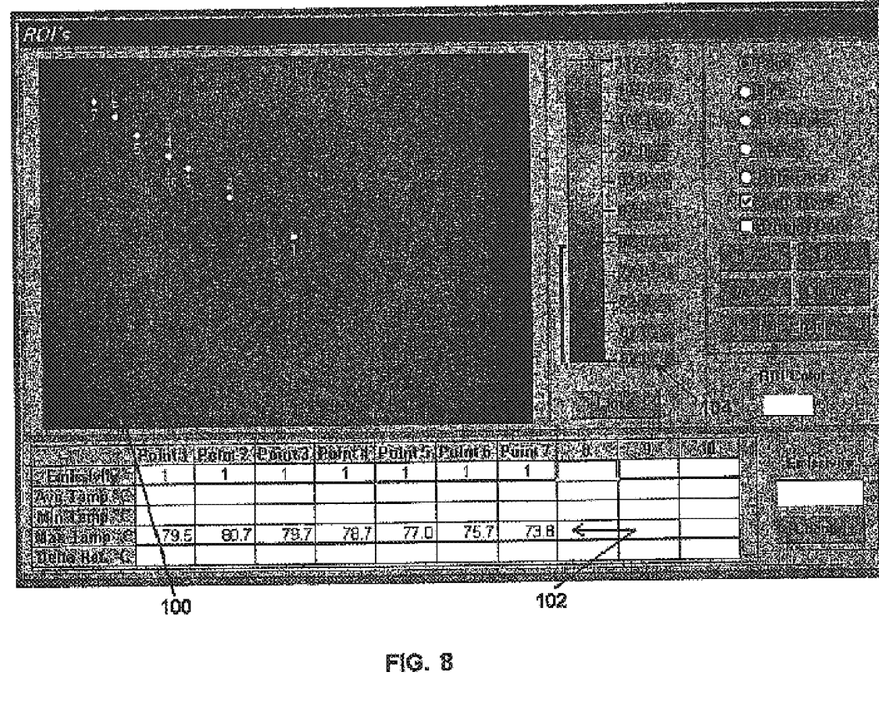
FIG. 8 is a graphic representation of a typical radiometric thermal image of a desired target produced by the thermal camera component of the combination of the invention.

Camera 14 (FIG. 1): The thermal imager camera 14, for example Mikron's thermal imagers model 7102, 7200 and 7515, includes an optical system which produces a thermal image of the target on a detector focal plane array 72 (FIG. 3). Software internal to the Mikron cameras mentioned above, produces various graphic portrayals of the received, infrared data. For example, a full radiometric thermal image of the desired target (see FIG. 8) can be immediately viewed through the eye piece view finder 73 of the camera and/or stored on a digital media for subsequent use or processing outside of the camera.

Cement 34 (FIG. 3): A cement such as Locktite® adhesive # 495, or equivalent, is used, as required, for permanent binding of some metallic parts.

A lens cap (not shown) protects the fisheye lens during storage from dust and dirt settling on optical surfaces.

Teflon® type tape 42 and 52, with exact thickness, is placed, as required, between metallic parts to reduce the friction between moving parts such as between the focus slide 38 and the spacer tube 40.

For the fisheye lens-camera assembly portion of the invention to be able to create thermal images of the interior of a high voltage electrical cabinet 94 so as to locate possible hot spots, an infrared viewing, access opening 92 (FIG. 6) is needed. This opening must allow inspection, but at the same time not be of such size as to degrade the NEMA safety rating of the electrical cabinet. The opening 92 is located in the cabinet face 74, at a position, in relation to the electrical power distribution blocks 96 (see FIG. 7), that optimizes the field of view for the lens assembly—imaging camera combination. Most high voltage electrical cabinets used are NEMA 1, 2, 3, 4 or 12 rated. The infrared viewing opening designed for the present invention allows the cabinet to retain a NEMA 4 rating which is the most demanding and meets the most stringent requirements.

Infrared View Port Alignment Ring 86 (FIG. 6): This part is machined or cast from metal or plastic and includes a central opening 87. The diameter of the opening is slightly larger(0.65 inches, 16.5 mm) than the access opening 92. Its primary function is to provide a nesting platform for the nose 20 of the fisheye lens assembly to rest and to axially align the optical axis 25 with the centerline axis of the hole 92 already drilled through the electrical cabinet face 74 for inspection purposes. The view port ring 86, in combination with the frusto-conical shape of the nose portion 20 of the housing 13, also provides approximately 10 degrees of freedom for the fisheye lens assembly to rotate, in any direction, in search of hot spots inside of the electrical cabinet 94 near the perimeter of the field of view. In addition, the port includes precision grooves for insertion of, two o-rings 84, 88,(FIG. 6) on both sides thereof for sealing out dirt and water, so that the NEMA 4 rating can be met and preserved.

Cap 90 (FIG. 6): This cap is machined or cast from high strength plastic. The cap, when secured to the view port ring 86, will seal the infrared viewing port by compressing the outside o-ring, 88. This insures the integrity of the cabinet NEMA rating before and after infrared inspection.

Ring and Chain Assembly 80, 81, 82 (FIG. 6): The chain-retaining ring 81 is made from thin metal either by stamping or laser cutting. Chain 80 is secured to the ring 81 at eyelet 79. Screw 82 at the other end of the chain is threaded into opening 83 in cap 90. Screws and Lock washers 76 & 78 (FIG. 6) are needed for installation of the infrared viewing port to the cabinet face 74 via the mounting holes 85 as typically configured and shown in FIG. 6. Chain 80 is of sufficient length so that when the retaining ring 81 is secured to the cabinet door, the retaining ring 81 holds the chain 80 freely, allowing unscrewing of the cap with ease, while retaining the cap chained to the view port assembly. This serves as a constant reminder to inspection personnel that the cap should be screwed in place after completion of the monitoring function so as not to breach the NEMA rating requirements.

Figure 7:
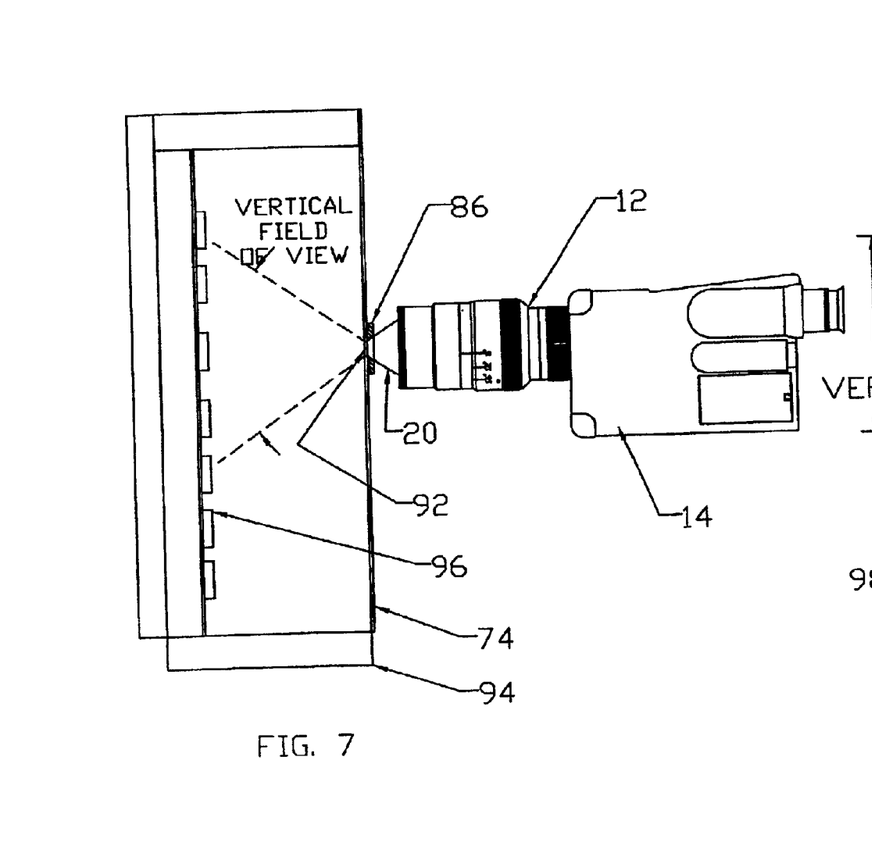
FIG. 7 is a side, elevation, partially sectional view of a shut cabinet in the process of being thermally examined by one version of the combination thermal camera-fisheye lens assembly portion of the invention.
Figure 7A:
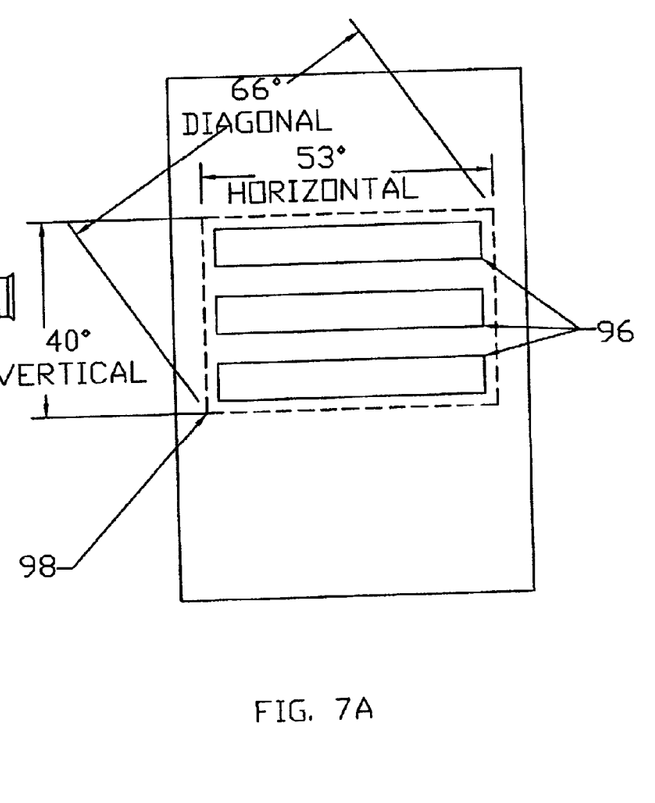
FIG. 7A is a schematic representation of a typical area of a shut cabinet accessible to thermal viewing by one version of the combination of the invention.

FIGS. 7 and 7A depict schematically the application of the combined fisheye lens assembly 12 and thermal imager 70 for use in the thermal imaging of electrical power distribution blocks 96 in the interior of an enclosure or cabinet 94. In FIG. 7A, the field of view 98 for the assembly is shown, for example, as 40° vertically and 53° horizontally, or 66° on the diagonal. The diagonal field of view of 66° stays constant regardless of the focusing distance. The camera-lens assembly can be moved up or down and/or side to side while the nose 20 of the assembly is nested in the view port ring 86. This expands the field of view sufficiently to permit scanning of the interior of the enclosure. The operator can focus more directly on the perimeter areas of the field of view so as to double check for possible lens vignetting errors.

Operational Procedure

The following is a suggested procedure for utilizing the thermal imaging combination of the invention. First-of-all a standard camera 14 is selected. All Mikron thermal imagers such as model 7102, 7200 and 7515 are acceptable for this measurement. The camera is connected to the fisheye lens assembly 12. The camera is then "set-up"; and, finally, the actual measurements made.

Camera-lens Assembly Procedure

First, the operator removes any existing lens ring on the imaging camera. He then secures the fisheye lens assembly 12 to the camera taking extra care to protect the camera's lens mounting threads, so as to avoid stripping the threads.

The camera 14 should then be adjusted to compensate for attenuation through the wide-angle, lens assembly 12. Thermal image cameras include this selection ability and internal frimware automatically adjusts for attenuation of the lens assembly 12. The scale tube 44 is rotated to set the lens assembly for an average depth of the enclosure, if known.

The level and sensitivity of the imaging camera is then adjusted according to the imager instruction manual. Usually 100° C. is the maximum temperature; while ambient is the minimum.

Actual Measurement

1. The operator first supports the fisheye lens assembly with the left hand. The right hand is placed in the imager strap. (See FIG. 2)

2. The lens cone 20 is then inserted flush into the view port ring 86.

3. While viewing through the eyepiece of the thermal imager, the operator, if required, is directed to move the imager up and down and sideways, to view larger regions inside the cabinet. He adjusts the focus to sharpen the image, as he does this, at each location, if required.

4. One possible image available to the operator, as noted above, because of the software built into the Mikron Company's cameras, is as pictured in FIG. 8. As viewed through the camera and as may be reproduced in a photograph or stored on a digital medium, the image at 100 is, in fact, a colorized rendition of the temperature profile of the field of view of the lens assembly for a given axial placement in the view part ring 86. The operator can select various points of interest and identify them on the image, 100, such as points 1, 2, 3, etc. The internal software will produce and display the associated temperatures, 103. The software can also provide a temperature scale, in color, 104, which allows the operator to more critically evaluate the image 100 in real time.

Thermal imaging cameras such as Mikron's model #s 7102, 7250 and 7515 store the images and data to PCMC1A cards. This allows subsequent analysis using a PC. Software is available which allows post image analysis. Also, more sophisticated software will permit computer enhancement of areas where distortions may occur, for example, the distortions attributable to fish-eye lens vignetting.

Thus it can be seen that the wide angle fisheye lens assembly of the invention provides new conveniences, safety, and economy when used in conjunction with traditional thermal imaging equipment and a relatively small access hole in the cabinet defining the enclosure. The fisheye lens assembly of the invention has been described for use with the specific thermal imaging camera of the assignee. It is to be understood that the fisheye lens assembly may be reconfigured for operation with other thermal imagers and other applications without deviating from the basic concept of the present invention.

While the present invention has been disclosed in connection with a preferred embodiment shown in detail, various modifications and improvements will become readily apparent to those skilled in the art.

So for example, whereas the preferred embodiment discloses the use of a separate fish-eye lens assembly taken together with a standard, available thermal imager, to accomplish the purposes of the invention, the breadth of the invention envisions the inclusion of the fish-eye lens assembly within an overall housing which includes the thermal imaging aspects of a standard camera. A reduction in the number of lenses of course would be a consequence of this combination leading to a reduction in the expense of the unit.

Further, even though a series of lenses are employed in the preferred embodiment of the fish-eye lens assembly, developments in optics suggest the use of aspherical lenses to compensate for distortions that presently require the use of a series of lenses to remedy. As such, a single wide-angle lens of appropriate design, should be able to accomplish the purposes of the series of lenses.

Accordingly, the spirit and scope of the present invention is to be limited only by the following claims.

What is claimed is:

1. In combination, an assembly for the thermal profiling of heat generating elements within the interior of an enclosure encompassed by a cabinet, the cabinet having a first face, the heat generating elements disposed a fixed distance, within a range, from said first face, the combination comprising:

(a) a lens assembly, said lens assembly of the fish-eye configuration, including
      (i) a housing;
      (ii) a series of infrared transmitting optical lenses mounted within said housing;
      said housing configured to have a co-axially aligned open front end and open rear end, said open front end being substantially smaller in relation to said open rear end;
   (b) a thermal imaging camera, each of said lenses in said series of infrared transmitting optical lenses being compatible with the spectral transmissivity of said thermal imaging camera;
   (c) means for connecting said open rear end of said housing to said thermal imaging camera, to thereby form a camera-lens assembly, said camera-lens assembly having a field of view;
   (d) an access opening formed in the face of the cabinet, said access opening having a maximum diameter of 16 mm nominal, said access opening having a predetermined relationship to the heat generating elements; and,
   (e) an infrared view port fixedly secured to the face of the cabinet, said infrared view port having a central opening, said infrared view port central opening being positioned about and approximately coextensive with said access opening, said infrared view port adapted and configured to form a nesting platform, centered about said infrared view port central opening, said infrared view port central opening having a predetermined relationship to the heat generating elements, said open front end of said housing adapted and configured to cooperatively engage said nesting platform so as to enable said open front end of said housing to be pivotally disposed on said nesting platform such that the operator can pivot the camera-lens assembly within a predetermined degree of rotation, in any direction, to thereby facilitate viewing an extended area of the interior which can be viewed within the field of view of the camera-lens assembly, and thus capture the thermal image due to the infrared radiation rays originating from the heat generating elements within the field of view including the heat generating elements in the extended area of the interior.

2. The combination according to claim 1 wherein one of said lenses in said series of lenses is a wide angle, objective lens.

3. The combination according to claim 2 wherein said wide angle, objective lens has an approximately 66° diagonally wide angle.

4. The combination according to claim 2 wherein said thermal imaging camera is selected from a group consisting of Mikron Instrument Company, Inc.'s model no. 7102, model no. 7200, or model no. 7515.

5. The combination according to claim 1 wherein the opening of said open front end of said housing is approximately 12 mm in diameter.

6. The combination according to claim 1 wherein said open front end of said housing has a frusto-conical shape tapering downward to an opening of said open front end.

7. The combination according to claim 6 wherein said opening in said open front end is approximately 12 mm in diameter.

8. The combination according to claim 6, wherein the predetermined degree of rotation is approximately 10°.

9. The combination according to claim 7 further comprising means for sealing closed said access opening and said infrared view port central opening when said access opening and said infrared view port central opening are not in use.

10. The combination according to claim 1 wherein the cabinet has a pre-specified NEMA safety rating before said access opening is formed in the face thereof, the combination further including means for sealing closed said access opening and said infrared view port central opening when said access opening and said infrared view port central opening are not in use, wherein said means for sealing closed said access opening and said infrared view port central opening are adapted, configured and utilized in a cooperative way with said infrared view port to ensure that the pre-specified NEMA safety rating of the cabinet is maintained.

11. The combination according to claim 10, wherein said means for sealing closed said access opening and said infrared view port central opening include a cap for sealingly, enclosing said infrared view port central opening.

12. The combination according to claim 11, further comprising a ring and chain assembly connected between the cabinet and said cap, whereby the operator is reminded to re-secure said cap on said infrared view port after using.

13. The combination according to claim 1 wherein access opening has a diameter equal to 0.625 inches (16 mm) nominally.

14. A new use for standard thermal imaging cameras to enable the thermal profiling of heat generating elements within the interior of an enclosure encompassed by a cabinet, the cabinet having a first face, the heat generating elements disposed a fixed distance, within a range, from said first face, comprising the steps of:
   (a) selecting a lens assembly, said lens assembly of the fish-eye configuration, including
      (i) a housing;
      (ii) a series of infrared transmitting optical lenses mounted within said housing;
      said housing configured to have a co-axially aligned open front end and open rear end, said open front end being substantially smaller in relation to said open rear end;
   (b) selecting a standard thermal imaging camera, each of said lenses in said series of infrared transmitting optical lenses being compatible with the spectral transmissibility of said thermal imaging camera;
   (c) connecting said open rear end of said housing to said thermal imaging camera, to thereby form a camera-lens assembly, said camera-lens assembly having a field of view;
   (d) forming an access opening in and through the face of the cabinet, said access opening having a maximum diameter of 16 mm nominal, said access opening having a predetermined relationship to the heat generating elements; and,
   (e) fixedly securing an infrared view port to the face of the cabinet, said infrared view port having a central opening, said infrared view port central opening being positioned about and approximately coextensive with said access opening, said infrared view port adapted and configured to form a nesting platform, centered about said infrared view port central opening, said infrared view port central opening having a predetermined relationship to the heat generating elements, said open front end of said housing adapted and configured to cooperatively engage said nesting platform so as to enable said open front end of said housing to be pivotally disposed on said nesting platform such that the operator can pivot the camera-lens assembly within a predetermined degree of rotation, in any direction, to thereby facilitate viewing an extended area of the interior which can be viewed within the field of view of the camera-lens assembly, and thus capture the thermal image due to the infrared radiation rays originating from the heat generating elements within the field of view including the heat generating elements in the extended area of the interior.

15. The new use according to claim 14 further including the step of selecting said standard thermal imaging camera from a group consisting of Mikron Instrument Company, Inc.'s model no. 7102, model no. 7200, or model no. 7515.

16. The new use according to claim 14 wherein said step of selecting a lens assembly further includes selecting a wide angle objective lens.

17. The new use according to claim 16 further comprising the step of selecting a wide angle objective lens having an approximately 66° diagonally wide angle.

18. The new use according to claim 14 wherein the predetermined degree of rotation is approximately 10° of rotation.

19. The new use according to claim 18 further including the step of providing a cap for sealing said infrared view port central opening when said infrared view port is not in use.

20. The new use according to claim 19 further including the step of affixing a ring and chain assembly to said cap and the cabinet face.

21. In combination, an assembly for the thermal profiling of heat generating elements within the interior of an enclosure encompassed by a cabinet, the cabinet having a first face, the heat generating elements disposed a fixed distance, within a range, from said first face, infrared radiation rays emanating from the heat generating elements, the combination comprising:
   (a) a sub-assembly including
      (i) a nose piece;
      (ii) a lens assembly, including at least one infrared transmitting optical lens, mounted in fixed predetermined spatial relationship to said nose piece, said lens assembly having a first optical axis and including a ray front surface, said nosepiece having a second optical axis, said nose piece configured to have a co-axially aligned open front end and open rear end about said second optical axis, said open front end being substantially smaller in relation to said open rear end, said first optical axis coaxially aligned with said second optical axis, said sub-assembly having a field of view;
   (b) an access opening formed through the face of the cabinet, said access opening having a maximum diameter of 16 mm nominal, said access opening disposed about a centerline axis, said access opening having a predetermined relationship to the heat generating elements;
   (c) an infrared view port fixedly secured to the face of the cabinet, said infrared view port having a central opening, said infrared view port central opening being positioned about and approximately coextensive with said access opening, said infrared view port adapted and configured to form a nesting platform, centered about said infrared view port central opening, said infrared view port central opening having a predetermined relationship to the heat generating elements, said open front end of said nose piece adapted and configured to cooperatively engage said nesting platform so as to enable said open front end of said nose piece to be pivotally disposed on said nesting platform,
   a portion of the infrared radiation rays passing through said infrared view port central opening, the spatial relationship between said nose piece and said at least one infrared transmitting optical lens adapted to produce a wide-angle image output of the portion of the infrared radiation rays passing through said infrared view port central opening incident at said ray front surface when said open front end of said nose piece is positioned and rested on said nesting platform such that said open front end of said nose piece is disposed immediately adjacent said infrared view port central opening and said second optical axis is co-axially aligned with said centerline axis; and, (d) means co-axially aligned with said second optical axis and positioned in spatial relationship to said lens assembly and adapted to receive, process and image said wide-angle image output to produce a thermal profile image of said heat generating elements, when said open front end of said nose piece is disposed immediately adjacent said infrared view port central opening and said second optical axis is co-axially aligned with said centerline axis or when the operator pivots the sub-assembly within a predetermined degree of rotation, in any direction, to thereby facilitate viewing an extended area of the interior which can be viewed within the field of view of the sub-assembly, and thus capture the thermal image due to the infrared radiation rays originating from the heat generating elements within the field of view including the heat generating elements in the extended area of the interior.

22. The combination according to claim 21, wherein the predetermined degree of rotation is approximately 10°.

23. The combination according to claim 21 further comprising means for sealing closed said infrared view port central opening when said infrared view port opening is not in use.

24. The combination according to claim 22 wherein the cabinet has a pre-specified NEMA safety rating before said access opening is formed in the face thereof, the combination further including means for sealing closed said access opening and said infrared view port central opening when said access opening and said infrared view port central opening are not in use, wherein said means for sealing closed said access opening and said infrared view port central opening are adapted, configured and utilized in a cooperative way with said infrared view port to ensure that the pre-specified NEMA safety rating of the cabinet is maintained.

25. A method to enable the thermal profiling of heat generating elements within the interior of an enclosure encompassed by a cabinet, the cabinet having a first face, the heat generating elements disposed a fixed distance, within a range, from said first face, infrared radiation rays emanating from the heat generating elements, comprising the steps of:

(a) selecting a sub-assembly, said sub-assembly including, (i) a nose piece;

(ii) a lens assembly, including at least one infrared transmitting optical lens, mounted in fixed predetermined spatial relationship to said nose piece, said lens assembly having a first optical axis and including a ray front surface, said nosepiece having a second optical axis, said nose piece configured to have a co-axially aligned open front end and open rear end about said second optical axis, said open front end being substantially smaller in relation to said open rear end, said first optical axis coaxially aligned with said second optical axis, (b) forming an access opening in and through the face of the cabinet, said access opening having a maximum diameter of 16 mm nominal, said access opening disposed about a centerline axis, said access opening having a predetermined relationship to the heat generating elements, (c) fixedly securing an infrared view port to the face of the cabinet, said infrared view port having a central opening, said infrared view port central opening being positioned about and approximately coextensive with said access opening, said infrared view port adapted and configured to form a nesting platform, centered about said infrared view port central opening, said infrared view port central opening having a predetermined relationship to the heat generating elements, said open front end of said nose piece adapted and configured to cooperatively engage said nesting platform so as to enable said open front end of said nose piece to be pivotally disposed on said nesting platform, a portion of the infrared radiation rays passing through said infrared view port central opening, the spatial relationship between said nose piece and said at least one infrared transmitting optical lens adapted to produce a wide-angle image output of the portion of the infrared radiation rays passing through said infrared view port central opening incident at said ray front surface when said open front end of said nose niece is positioned and rested on said nesting platform such that said open front end of said nose piece disposed immediately adjacent said infrared view port central opening and said second optical axis is co-axially aligned with said centerline axis; and, (d) providing means co-axially aligned with said second optical axis and positioned in spatial relationship to said lens assembly and adapted to receive, process and image said wide-angle image output to produce a thermal profile image of said heat generating elements, when said open front end of said nose piece is disposed immediately adjacent said infrared view port central opening and said second optical axis is co-axially aligned with said centerline axis or when the operator pivots the sub-assembly within a predetermined degree of rotation, in any direction, to thereby facilitate viewing an extended area of the interior which can be viewed within the field of view of the sub-assembly, and thus capture the thermal image due to the infrared radiation rays originating from the heat generating elements within the field of view including the heat generating elements in the extended area of the interior.

26. The method according to claim 25 wherein the predetermined degree of rotation is approximately 10°.

27. The method according to claim 26 further including the step of providing a cap for sealing said infrared view port central opening when said infrared view port central opening is not in use.

28. The method according to claim 27 further including the step of affixing a ring and chain assembly to said cap and the cabinet face.

* * * * *